US009823857B1

(12) United States Patent
Pendharkar et al.

(10) Patent No.: US 9,823,857 B1
(45) Date of Patent: Nov. 21, 2017

(54) SYSTEMS AND METHODS FOR END-TO-END QUALITY OF SERVICE CONTROL IN DISTRIBUTED SYSTEMS

(71) Applicant: Symantec Corporation, Mountain View, CA (US)

(72) Inventors: Niranjan Pendharkar, Pune (IN); Prasanna Wakhare, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 174 days.

(21) Appl. No.: 14/671,092

(22) Filed: Mar. 27, 2015

(51) Int. Cl.
| | |
|---|---|
| G06F 12/00 | (2006.01) |
| G06F 13/00 | (2006.01) |
| G06F 13/28 | (2006.01) |
| G06F 3/06 | (2006.01) |
| G06F 9/50 | (2006.01) |

(52) U.S. Cl.
CPC ............ G06F 3/0613 (2013.01); G06F 3/065 (2013.01); G06F 3/067 (2013.01); *G06F 3/0646* (2013.01); *G06F 3/0653* (2013.01); *G06F 3/0683* (2013.01); G06F 9/505 (2013.01)

(58) Field of Classification Search
CPC ........ G06F 3/0613; G06F 3/065; G06F 3/067; G06F 3/068; G06F 3/0683; G06F 3/0646; G06F 3/0653; G06F 2009/4557; G06F 9/505; G06F 9/5055; G06F 9/5027; G06F 9/5083; G06F 9/5088; G06F 9/4856; G06F 9/46
USPC ......... 711/161, 162, 114, 112, 103; 718/104, 718/105
See application file for complete search history.

(56) References Cited

U.S. PATENT DOCUMENTS

| 8,812,744 B1 | 8/2014 | Iyigun et al. |
| 2004/0078534 A1* | 4/2004 | Scheid .................. G06F 3/0613 |
| | | 711/162 |
| 2012/0054329 A1 | 3/2012 | Gulati et al. |
| 2012/0239859 A1 | 9/2012 | Lary et al. |

(Continued)

OTHER PUBLICATIONS

EMC Fast VP for Unified Storage Systems—A Detailed Review, Oct. 2011, EMC White Paper, pp. 4-11.*

(Continued)

*Primary Examiner* — Yaima Rigol
*Assistant Examiner* — Shane Woolwine
(74) *Attorney, Agent, or Firm* — FisherBroyles LLP

(57) ABSTRACT

A computer-implemented method for end-to-end quality of service control in distributed systems may include (1) identifying a plurality of computing systems, wherein each computing system (a) is coupled to a storage resource for the computing system, (b) hosts a plurality of applications that share the storage resource coupled to the computing system, (c) hosts a quality of service agent that limits throughput utilization of the storage resource by each of the plurality of applications, and (d) copies input/output data generated by the applications to a secondary computing system, (2) determining a throughput capacity of the secondary computing system, and (3) providing feedback to at least one quality of service agent hosted by at least one computing system to further limit throughput utilization of at least one of a plurality of applications hosted by the computing system. Various other methods, systems, and computer-readable media are also disclosed.

20 Claims, 7 Drawing Sheets

(56) References Cited

U.S. PATENT DOCUMENTS

| | | | |
|---|---|---|---|
| 2014/0380324 A1* | 12/2014 | Xiao | G06F 9/5083 |
| | | | 718/102 |
| 2015/0286492 A1 | 10/2015 | Breitgand et al. | |
| 2016/0041787 A1* | 2/2016 | Nicolae | G06F 3/0631 |
| | | | 710/74 |
| 2016/0132358 A1 | 5/2016 | Antony et al. | |
| 2016/0162315 A1 | 6/2016 | Pannem et al. | |

OTHER PUBLICATIONS

Fang Lu Guo; Systems and Methods for Dynamic Load Balancing on Disks; U.S. Appl. No. 14/584,549, filed Dec. 29, 2014.

Prasanna Wakhare, et al.; Systems and Methods for Improving Quality of Service Within Hybrid Storage Systems; U.S. Appl. No. 14/673,898, filed Mar. 31, 2015.

Gulati, Ajay et al., "PARDA : Proportional Allocation of Resources for Distributed Storage Access", http://citeseerx.ist.psu.edu/viewdoc/summary?doi=10.1.1.188.3027&rank=1, as accessed Mar. 3, 2015, (2009).

Gulati, Ajay et al., "Demand based hierarchical QoS using storage resource pools", http://citeseerx.ist.psu.edu/viewdoc/summary?doi=10.1.1.302.9026&rank=1, as accessed Mar. 3, 2015, (2012).

VMware vSphere best practices for IBM SAN Volume Controller and IBM Storwize family; by Burbridge, et al.; IBM Sep. 2013; as published on the internet at https://www-356.ibm.com/partnerworld/wps/servlet/download/DownloadServlet?id=uEDQaFUbIIZiPCA$cnt&attachmentName=vmware_vsphere_best_practices.pdf&token=MTQ3NTQ4NjU5ODgxOQ==&locale=en_ALL_ZZ.

* cited by examiner

SYSTEMS AND METHODS FOR END-TO-END QUALITY OF SERVICE CONTROL IN DISTRIBUTED SYSTEMS

BACKGROUND

In the digital age, organizations increasingly depend on computing resources to manage data and to provide internal and external services. In order to manage increasingly complex information technology infrastructures, some organizations may use infrastructure-as-a-service platforms for deploying applications. The infrastructure-as-a-service model may allow organizations to bring applications online at reduced cost and with greater flexibility and scalability. In addition, infrastructure-as-a-service platforms may provide a unified infrastructure for providing secondary services for applications such as data protection and high availability.

However, disparate applications sharing an underlying infrastructure may cause conflicts as applications consume and compete for computing resources. For example, a single hypervisor may host multiple virtual machines, each of which may consume the computing resources provided by the hypervisor. In order to meet the required performance standards for the various applications, an infrastructure-as-a-service platform may curb the resource usage of competing applications. However, even though the applications hosted on an infrastructure-as-a-service platform may have sufficient resources to properly execute, secondary services provided for the applications via the infrastructure may operate with limited resources and become overwhelmed when the applications are operating efficiently.

Accordingly, the instant disclosure identifies and addresses a need for additional and improved systems and methods for end-to-end quality of service control in distributed systems.

SUMMARY

As will be described in greater detail below, the instant disclosure generally relates to systems and methods for end-to-end quality of service control in distributed systems by determining the capacity of a secondary computing system that receives copies of input/output data generated by applications on primary computing systems and providing feedback to quality of service agents that regulate resource usage of the applications on the primary computing systems to ensure that the applications do not overwhelm the capacity of the secondary computing system.

In one example, a computer-implemented method for end-to-end quality of service control in distributed systems may include (1) identifying a plurality of computing systems, where each computing system among the computing systems (a) is coupled to a storage resource for the computing system, (b) hosts applications that share the storage resource coupled to the computing system, (c) hosts a quality of service agent that limits throughput utilization of the storage resource by each of the applications to the storage resource to maintain at least one specified throughput service level specified for at least one competing application among the applications, and (d) copies input/output data generated by the applications to a secondary computing system, (2) determining a throughput capacity of the secondary computing system, and (3) providing feedback to at least one quality of service agent hosted by at least one computing system among the computing systems to further limit throughput utilization of at least one of the applications hosted by the computing system in response to determining the throughput capacity of the secondary computing system.

In one embodiment, each computing system among the computing systems hosts applications that share the storage resource coupled to the computing system by hosting virtual machines coupled to a virtual storage appliance that provisions, for the virtual machines, virtual storage that relies on the storage resource.

In one embodiment, each computing system among the computing systems copies the input/output data generated by the applications to the secondary computing system to offload at least one data protection operation from the computing system to the secondary computing system.

In one embodiment, each computing system among the computing systems copies the input/output data generated by the applications to the secondary computing system by copying the input/output data to a writeback log and episodically forwarding a queued portion of the writeback log to the secondary computing system.

In one embodiment, the computer-implemented method may further include providing, from each computing system among the computing systems to the secondary computing system, information indicating a demand for copying input/output data to the secondary computing system.

In some examples, the computer-implemented method may further include determining that the throughput capacity of the secondary computing system is less than a collective demand for copying input/output data to the secondary computing system.

In some examples, providing feedback to at least one quality of service agent hosted by at least one computing system among the computing systems to further limit throughput utilization of at least one of the applications hosted by the computing system is in response to determining that the throughput capacity of the secondary computing system is less than the collective demand.

In one embodiment, the information indicating the demand projects an anticipated demand based on at least one observation of an application which generates the input/output data to be copied to the secondary computing system.

In one embodiment, the computer-implemented method may further include receiving, from each computing system among the computing systems at the secondary computing system, information specifying a throughput service level for each application on the computing system.

In some examples, providing feedback to at least one quality of service agent hosted by at least one computing system among the computing systems to further limit throughput utilization of at least one of the applications hosted by the computing system may include providing, based on the information specifying the throughput service level for each application on the computing system, a maximum throughput allotment to the quality of service agent for the computing system that is sufficient to meet the throughput service level for each application on the computing system.

In some examples, providing feedback to at least one quality of service agent hosted by at least one computing system among the computing systems to further limit throughput utilization of at least one of the applications hosted by the computing system may include providing, based on the information specifying the throughput service level for each application on the computing system, a maximum throughput allotment to the quality of service agent for at least one selected application of the applications that is sufficient to meet the throughput service level for the selected application.

In one embodiment, a system for implementing the above-described method may include (1) an identification module, stored in memory, that identifies a plurality of computing systems, where each computing system among the computing systems (a) is coupled to a storage resource for the computing system, (b) hosts applications that share the storage resource coupled to the computing system, (c) hosts a quality of service agent that limits throughput utilization of the storage resource by each of the applications to the storage resource to maintain at least one specified throughput service level specified for at least one competing application among the applications, and (d) copies input/output data generated by the applications to a secondary computing system, (2) a determination module, stored in memory, that determines a throughput capacity of the secondary computing system, (3) a providing module, stored in memory, that provides feedback to at least one quality of service agent hosted by at least one computing system among the computing systems to further limit throughput utilization of at least one of the applications hosted by the computing system in response to determining the throughput capacity of the secondary computing system, and (4) at least one physical processor configured to execute the identification module, the determination module, and the providing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a plurality of computing systems, where each computing system among the computing systems (a) is coupled to a storage resource for the computing system, (b) hosts applications that share the storage resource coupled to the computing system, (c) hosts a quality of service agent that limits throughput utilization of the storage resource by each of the applications to the storage resource to maintain at least one specified throughput service level specified for at least one competing application among the applications, and (d) copies input/output data generated by the applications to a secondary computing system, (2) determine a throughput capacity of the secondary computing system, and (3) provide feedback to at least one quality of service agent hosted by at least one of the computing systems to further limit throughput utilization of at least one of the applications hosted by the computing system in response to determining the throughput capacity of the secondary computing system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
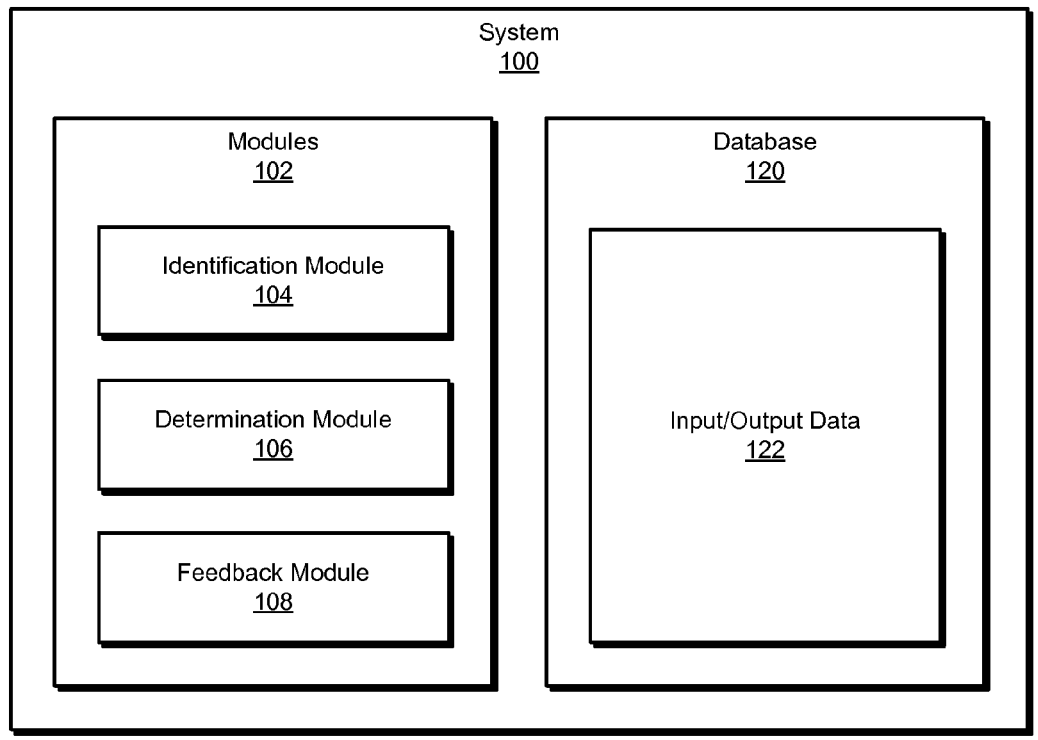
FIG. 1 is a block diagram of an exemplary system for end-to-end quality of service control in distributed systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for end-to-end quality of service control in distributed systems. As will be explained in greater detail below, by determining the capacity of a secondary computing system that receives copies of input/output data generated by applications on primary computing systems and providing feedback to quality of service agents that regulate resource usage of the applications on the primary computing systems, the systems and methods described herein may ensure that the applications do not overwhelm the capacity of the secondary computing system, even though the applications may not be directly responsible for input/output operations performed to the secondary computing system.

The following will provide, with reference to FIGS. 1, 2, 4, and 5, detailed descriptions of exemplary systems for end-to-end quality of service control in distributed systems. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for end-to-end quality of service control in distributed systems. As illustrated in this figure, exemplary system 100 may include one or more modules 102 for performing one or more tasks. For example, and as will be explained in greater detail below, exemplary system 100 may also include an identification module 104 that may identify a plurality of computing systems, where each computing system in the plurality of computing systems (a) is coupled to a storage resource for the computing system, (b) hosts a plurality of applications that share the storage resource coupled to the computing system, (c) hosts a quality of service agent that limits throughput utilization of the storage resource by each of the plurality of applications to the storage resource to maintain at least one specified throughput service level specified for at least one competing application within the plurality of applications, and (d) copies input/output data generated by the plurality of applications to a secondary computing system. Exemplary system 100 may additionally include a determination module 106 that may determine a throughput capacity of the secondary computing system. Exemplary system 100 may also include a providing module 108 that may provide feedback to at least one quality of service agent hosted by at least one computing system within the plurality of computing systems to further limit throughput utilization of at least one of a plurality of applications hosted by the computing system in response to determining the throughput capacity of the secondary computing system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing systems 202(1)-(n) and/or secondary computing system 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store input/output data 122. For example, input/output data 122 may include portions of one or more writeback logs and/or snapshots of application virtual machine data.

Database 120 may represent portions of a single database or computing device or a plurality of databases or computing devices. For example, database 120 may represent a portion of computing systems 202(1)-(n), secondary computing system 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as computing systems 202(1)-(n), secondary computing system 206 in FIG. 2, computing system 610 in FIG. 6, and/or portions of exemplary network architecture 700 in FIG. 7.

Figure 2:
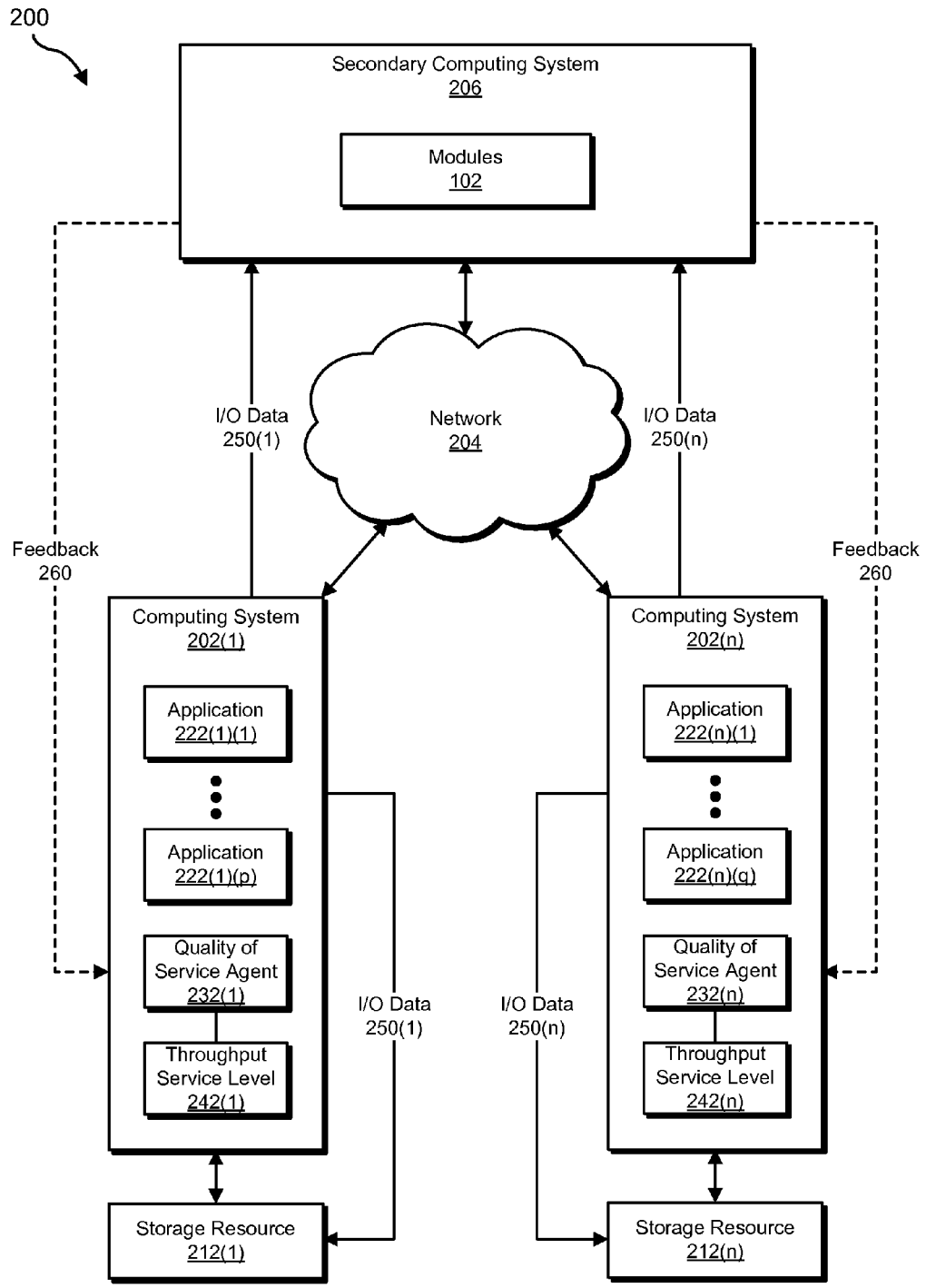
FIG. 2 is a block diagram of an additional exemplary system for end-to-end quality of service control in distributed systems.

Exemplary system 100 in FIG. 1 may be implemented in a variety of ways. For example, all or a portion of exemplary system 100 may represent portions of exemplary system 200 in FIG. 2. As shown in FIG. 2, system 200 may include computing systems 202(1)-(n) in communication with a secondary computing system 206 via a network 204. In one example, computing systems 202(1)-(n) may be programmed with one or more of modules 102 and/or may store all or a portion of the data in database 120. Additionally or alternatively, secondary computing system 206 may be programmed with one or more of modules 102 and/or may store all or a portion of the data in database 120.

In one embodiment, one or more of modules 102 from FIG. 1 may, when executed by at least one processor of computing systems 202(1)-(n) and/or secondary computing system 206, enable computing systems 202(1)-(n) and/or secondary computing system 206 to provide end-to-end quality of service control in distributed systems. For example, and as will be described in greater detail below, one or more of modules 102 may cause computing systems 202(1)-(n) and/or secondary computing system 206 to end-to-end quality of service control in distributed systems. For example, and as will be described in greater detail below, identification module 104 may identify computing systems 202(1)-(n), where computing systems 202(1)-(n) (a) are coupled to storage resources 212(1)-(n) for computing system 202(1)-(n), (b) host groups of applications 222(1)(1)-(1)(p) through 222(n)(1)-(n)(q) that share the storage resource of storage resources 212(1)-(n) coupled to the corresponding computing system of computing systems 202(1)-(n), (c) host quality of service agents 232(1)-(n) that limit throughput utilization of the corresponding storage resources 212(1)-(n) by the corresponding groups of applications 222(1)(1)-(1)(p) through 222(n)(1)-(n)(q)) to storage resources 212(1)-(n) to maintain specified throughput service levels 242(1)-(n) specified for competing applications within groups of applications 222(1)(1)-(1)(p) through 222(n)(1)-(n)(q), and (d) copies input/output data 250(1)-(n) generated by applications 222(1)(1)-(1)(p) through 222(n)(1)-(n)(q) to secondary computing system 206. Determination module 106 may determine a throughput capacity 216 of secondary computing system 206. Providing module 108 may provide feedback 260 to at least one of quality of service agents 232(1)-(n) hosted by computing systems 202(1)-(n) to further limit throughput utilization of at least one of applications 222(1)(1)-(1)(p) through 222(n)(1)-(n)(q) hosted by the corresponding computing systems in response to determining throughput capacity 216 of secondary computing system 206.

Computing systems 202(1)-(n) generally represent any type or form of computing device capable of reading computer-executable instructions. Examples of computing systems 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device. In various examples, computing systems 202(1)-(n) may represent hypervisors and/or nodes within a cloud computing infrastructure (e.g., that host hypervisors).

Secondary computing system 206 generally represents any type or form of computing device that is capable of reading computer-executable instructions. Examples of secondary computing system 206 include, without limitation, application servers and database servers configured to provide various database services and/or run certain software applications. In various examples, secondary computing system 206 may represent a data protection appliance and/or a node within a cloud computing infrastructure (e.g., that provides one or more data protection services).

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing systems 202(1)-(*n*) and secondary computing system 206.

Figure 3:
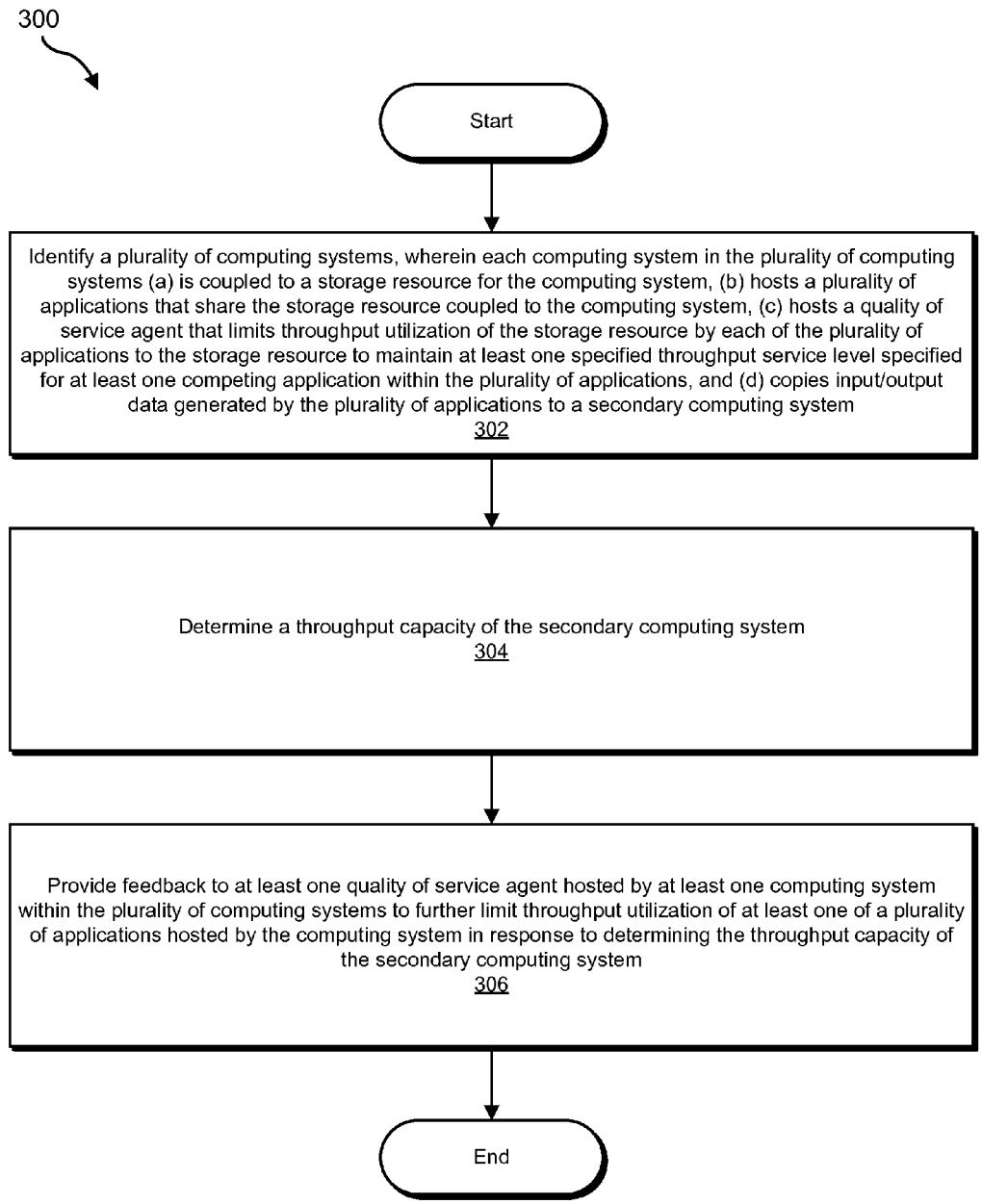
FIG. 3 is a flow diagram of an exemplary method for end-to-end quality of service control in distributed systems.

FIG. 3 is a flow diagram of an exemplary computer-implemented method 300 for end-to-end quality of service control in distributed systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify a plurality of computing systems, wherein each computing system in the plurality of computing systems (a) is coupled to a storage resource for the computing system, (b) hosts a plurality of applications that share the storage resource coupled to the computing system, (c) hosts a quality of service agent that limits throughput utilization of the storage resource by each of the plurality of applications to the storage resource to maintain at least one specified throughput service level specified for at least one competing application within the plurality of applications, and (d) copies input/output data generated by the plurality of applications to a secondary computing system. For example, identification module 104 may, as part of one or more of computing systems 202(1)-(*n*) in FIG. 2, identify computing systems 202(1)-(*n*), where computing systems 202(1)-(*n*) (a) are coupled to storage resources 212(1)-(*n*) for computing system 202(1)-(*n*), (b) host groups of applications 222(1)(1)-(1)(*p*) through 222(*n*)(1)-(*n*)(*q*) that share the storage resource of storage resources 212(1)-(*n*) coupled to the corresponding computing system of computing systems 202(1)-(*n*), (c) host quality of service agents 232(1)-(*n*) that limit throughput utilization of the corresponding storage resources 212(1)-(*n*) by the corresponding groups of applications 222(1)(1)-(1)(*p*) through 222(*n*)(1)-(*n*)(*q*)) to storage resources 212(1)-(*n*) to maintain specified throughput service levels 242(1)-(*n*) specified for competing applications within groups of applications 222(1)(1)-(1)(*p*) through 222(*n*)(1)-(*n*)(*q*), and (d) copies input/output data 250(1)-(*n*) generated by applications 222(1)(1)-(1)(*p*) through 222(*n*)(1)-(*n*)(*q*) to secondary computing system 206.

The term "storage resource," as used herein, generally refers to any limited storage resource for which two or more applications may compete. For example, the term "storage resource" may refer to a storage disk, a storage array, and/or a storage system. In some examples, the term "storage resource" may refer to a resource relied upon for performing storage operations. For example, the term "storage resource" may refer to an input/output path and/or a storage controller. In some examples, the term "storage resource" may refer to a resource that represents a bottleneck for performing storage operations (e.g., a component that represents an early point of failure when storage demands are high). In some examples, the term "storage resource" may refer to a local storage device that is connected to a computing system running a primary application (e.g., a local storage device that is connected to a hypervisor that hosts multiple virtual machines that may compete for usage of the local storage device). Additionally or alternatively, the term "storage resource" may refer to a virtual storage resource and/or a storage service (e.g., provided by and/or via a hypervisor to provide storage for virtual machines hosted by the hypervisor). As will be explained in greater detail below, in some examples the storage resource may be limited in terms of available throughput. Additionally or alternatively, the storage resource may be limited in terms of the extent to which low-latency operations are supported.

The term "application," as used herein, generally refers to any application, program, and/or workload that may compete for utilization of a storage resource with one or more additional applications. In some examples, the term "application" may refer to an application that executes within a virtual machine. Additionally or alternatively, the term "application" may refer to a virtual machine that executes an application and/or to a guest operating system within such a virtual machine. In some examples, the term "application" may refer to a primary application. For example, the term "application" may refer to an application which is hosted on a cloud computing system to take input from and/or to provide output to a client outside the cloud computing system (e.g., as opposed to a support application and/or a secondary application that operates to provide one or more services for, to extend the functionality of, and/or to improve the operation of a primary application). In some examples, the application may operate under a service level agreement. As used herein, the term "service level agreement" may refer to any standard defining a level of service to be provided for an application and/or for one or more computing elements upon which an application relies. In some examples, the term "service level agreement" may refer to an operational level agreement. In some examples, a service level agreement may be between distinct entities (e.g., a service provider and a service consumer, such as an infrastructure-as-a-service provider and an infrastructure-as-a-service consumer who wishes to host the application with the infrastructure-as-a-service provider). Additionally or alternatively, a service level agreement may refer to an internally defined service level standard. For example, a service level agreement may include a specified level of service for a private cloud computing system to provide an application (e.g., where the private cloud computing system and the application are owned, managed, and/or controlled by the same entity). In some examples, the application may compete for storage resources with one or more additional applications, which may operate under corresponding service level agreements. In some examples, two or more applications (e.g., owned by, managed by, controlled by, and/or executed for distinct entities) may rely on a storage resource and operate under service level agreements that provide for a minimum level and/or quality of access to the storage resource. Accordingly, as will be explained in greater detail below, an infrastructure as a service provider may utilize a quality of service engine to attempt to enforce service level agreements (e.g., by restricting usage of a storage resource by one application in favor of other applications).

The term "quality of service agent," as used herein, generally refers to any agent, engine, module, service, and/or computing system functionality for supporting and/or enforcing one or more service level agreements. For example, a quality of service agent may provide, regulate, and/or limit access to a computing resource by one or more applications (e.g., to ensure and/or improve the probability of remaining applications having sufficient access to computing resources to meet their respective service level agreements). In some examples, a quality of service agent may execute on, be hosted by, and/or interface with a computing system that hosts one or more applications for which the quality of service agent is responsible in enforcing and/or facilitating service level agreements. For example, a quality of service agent may execute on a hypervisor (and/or on a computing system that hosts a hypervisor) and may regulate access to one or more resources by one or more applications hosted on the hypervisor.

The term "throughput," as used herein, generally refers to any measurement of data transfer to, data transfer from, and/or data handling by a storage resource. In some examples, the term "throughput" may refer to the scale of input/output (I/O) operations performed over a period of time. For example, the term "throughput" may refer to a number of bytes of data per second ("bps"). Additionally or alternatively, the term "throughput" may refer to a number of discrete I/O operations per second ("iops"). In some examples, the term "throughput" may refer to a normalized combination of bps and iops (e.g., in the form of a throughput unit designated by a "credit" or "token"). For example, a single I/O operation of 8 kilobytes may correspond to 1 credit of throughput (as normalized), two I/O operations of 8 kilobytes may correspond to 2 credits of throughput (as normalized), but a single I/O operation of 1 megabyte may also correspond to 2 credits of throughput (as normalized, instead of, e.g., 128 credits)—e.g., because two I/O operations of 8 kilobytes may consume a storage resource to the same degree as one I/O operation of 1 megabyte.

The term "throughput service level," as used herein, generally refers to any direct or indirect specification of throughput to be provided. In some examples, a throughput service level may be defined explicitly. Additionally or alternatively, a throughput service level may be set implicitly and/or derived in relation to another service level specification. For example, an explicit service level agreement may provide that an application is to have the capacity to perform at least 100 application-level transactions per second. A quality of service agent may then translate this stipulation into a minimum amount of iops required by the application in order to meet the requirement of 100 application-level transactions per second. In some examples, a throughput service level may be further qualified by additional conditions. For example, a throughput service level may stipulate a maximum latency of I/O operations performed. Additionally or alternatively, the throughput service level may operate as a part of a broader service level agreement that specifies latency requirements, reliability requirements, and/or other service level requirements. In some examples, the throughput service level may be defined in terms of access by an application to a specified storage resource. Additionally or alternatively, the throughput service level may be defined in terms of operations to be performed by an application (e.g., that depend on a storage resource).

The term "input/output data," as used herein, generally refers to any input/output operations and/or data represented by input/output operations. In some examples, input/output data may include write operations. In some examples, applications may utilize the storage resource by sending input/output data to the storage resource. As will be explained in greater detail below, in some examples, one or more systems described herein may copy input/output data that is sent to a storage resource to a secondary computing system (e.g., so that the secondary storage system may process the input/output data but not by further consuming the storage resource with additional input/output operations). In some examples, the computing systems may copy input/output data into a different format. For example, the input/output data may originate in the form of multiple input/output operations and be copied in the form of data log chunks.

Identification module 104 may identify the plurality of computing systems in any suitable manner and in any of a variety of contexts. In one example, identification module 104 may execute on the secondary computing system and/or communicate with the secondary computing system to provide a service to the secondary computing system. For example, identification module 104 may operate as a part of a quality of service engine (e.g., running on the secondary computing system) that ensures that the secondary computing system has sufficient computing resources available to handle demand on the secondary computing system. Accordingly, identification module 104 may identify the plurality of computing systems by receiving and/or intercepting communications from each of the plurality of computing systems. For example, identification module 104 may identify the plurality of computing systems by identifying attempts by the plurality of computing systems to copy input/output data to the secondary computing system. Additionally or alternatively, identification module 104 may identify the plurality of computing systems by identifying a configuration specification that specifies that the plurality of computing systems are to copy input/output data to the secondary computing system. In some examples, identification module 104 may identify the plurality of computing systems by identifying a connection between each of the plurality of computing systems and the secondary computing systems. Additionally or alternatively, as will be explained in greater detail below, identification module 104 may identify the plurality of computing systems by receiving information from quality of service agents executing on the plurality of computing systems that indicate a level of demand for ingesting data from the plurality of computing systems to the secondary computing system.

In one embodiment, each computing system in the plurality of computing systems may host a plurality of applications that share the storage resource coupled to the computing system by hosting a plurality of virtual machines coupled to a virtual storage appliance that provisions, for the plurality of virtual machines, virtual storage that relies on the storage resource. As used herein, the term "virtual storage appliance" may refer to any system that may expose virtual storage to one or more virtual machines. In some examples, a virtual storage appliance may run as a virtual machine (e.g., a dedicated virtual machine for providing storage services to other virtual machines) on a hypervisor and provision virtual disk storage to other virtual machines (e.g., application virtual machines) on the hypervisor. For example, a virtual storage appliance may take into custody one or more storage resources connected to the hypervisor and/or a computing system hosting the hypervisor. The virtual storage appliance may then expose storage to one or more application virtual machines via a network data transfer protocol (e.g., Network File System (NFS), Internet Small Computer System Interface (iSCSI), etc.). Thus, in some examples, I/O operations by application virtual machines may pass through the virtual storage appliance. In these examples, as will be explained in greater detail below, the virtual storage appliance may copy the I/O data from each virtual machine to a corresponding log (e.g., to later be forwarded to the secondary storage system).

In one example, each computing system in the plurality of computing systems may copy the input/output data generated by the plurality of applications to the secondary computing system to offload at least one data protection operation from the computing system to the secondary computing system. For example, as discussed above, each computing system may copy the input/output data (from the virtual storage appliance as the I/O data passes through) to an I/O log for the originating application. As will be explained in greater detail below, the computing system may later copy the I/O data from the I/O log to the secondary computing system.

In one example, each computing system in the plurality of computing systems may copy the input/output data generated by the plurality of applications to the secondary computing system by (1) copying the input/output data to a writeback log and (2) episodically forwarding a queued portion of the writeback log to the secondary computing system. For example, each computing system may (e.g., via the virtual storage appliance) cache a copy of I/O data (e.g., in separate writeback logs for each originating application). Each computing system may also (e.g., via the virtual storage appliance) periodically forward I/O data from the cache to the secondary computing system. For example, the virtual storage appliance may insert a marker into a writeback log each time I/O data from the writeback log is forwarded to the secondary computing system. At the beginning of an episodic caching interval, the virtual storage appliance may forward the most recent data (back to a previously inserted marker) from the writeback log back to a previous marker and insert a new marker at the end of the writeback log. At the beginning of a subsequent caching interval, the virtual storage appliance may forward the I/O data following the new marker.

Figure 4:
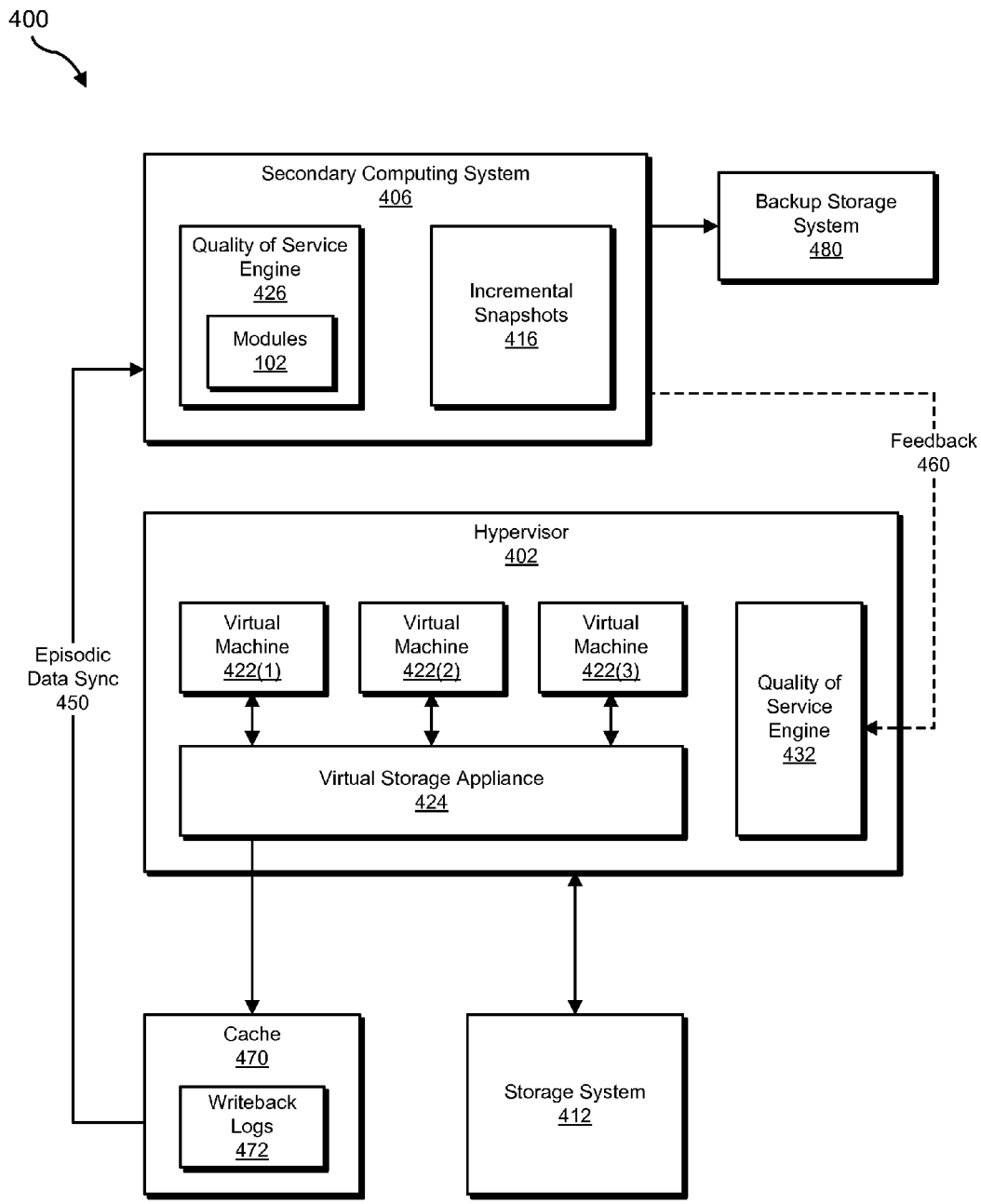
FIG. 4 is a block diagram of an exemplary computing system for end-to-end quality of service control in distributed systems.

To illustrate various of the above-discussed examples, FIG. 4 shows an exemplary system 400. As shown in FIG. 4, exemplary system 400 may include a hypervisor 402 and a secondary computing system 406. In this example, secondary computing system 406 may provide data backup services on behalf of virtual machines 422(1)-(3) on hypervisor 402. In various examples, hypervisor 402 may operate alongside other hypervisors (not illustrated), each of which may also offload backup services to secondary computing system 406. In one example, virtual machines 422(1)-(3) may consume storage resources provided by a storage system 412 (including, e.g., I/O throughput) via a virtual storage appliance 424. In addition, a quality of service engine 432 may regulate the utilization of storage system 412 by virtual machines 422(1)-(3) (e.g., to ensure that each of virtual machines 422(1)-(3) can meet service level objectives by preventing any of virtual machines 422(1)-(3) from overconsuming computing resources, such as the throughput capacity of storage system 412). As virtual machines 422(1)-(3) perform I/O operations (e.g., writing data that is ultimately stored on storage system 412), virtual storage appliance 424 may copy the I/O data to writeback logs 472 in cache 470. Virtual storage appliance 424 may episodically perform an episodic data sync 450, forwarding one or more portions of writeback logs 472 to secondary computing system 406. In one example, secondary computing system may generate incremental snapshots 416 from the writeback logs 472 and store incremental snapshots 416 in a backup storage system 480. In this manner, data protection operations may be offloaded from hypervisor and storage system 412 onto secondary computing system 406 and backup storage system 480, thereby preserving computing resources for virtual machines 422(1)-(3) to execute. However, depending on the timing of episodic data sync 450 as portions of writeback logs 472 (representing potentially large amounts of data generated by virtual machines 422(1)-(3)) are forwarded to secondary computing system 406, secondary computing system 406 may become overwhelmed (e.g., because several large portions of writeback logs 472 are received in a short span of time, exceeding the capacity of secondary computing system 406 to process efficiently, effectively, and/or under specified service level agreements). Accordingly, as will be explained in greater detail below, the systems and methods may provide feedback 460 to quality of service engine 432 so that quality of service engine 432 further limits the activity of virtual machines 422(1)-(3) to account for the limits of secondary computing system 406.

Thus, in one exemplary illustration of step 302 of FIG. 3, identification module 104 may, as a part of quality service engine 426 on secondary computing system 406, identify a plurality of computing systems including hypervisor 402.

Returning to FIG. 3, at step 304, one or more of the systems described herein may determine a throughput capacity of the secondary computing system. For example, determination module 106 may, as part of computing systems 202(1)-(n) in FIG. 2, determine throughput capacity 216 of secondary computing system 206.

The term "throughput capacity," as used herein, generally refers to the capacity for a computing system to accept, process, and/or store data at a specified throughput. In some examples, the term "throughput capacity" may refer to the overall throughput capacity of a computing system. Additionally or alternatively, the term "throughput capacity" may refer to a spare throughput capacity of a computing system (e.g., after accounting for known I/O activity and/or reserved throughput allowances). In some examples, the term "throughput capacity may refer to a projected throughput capacity and/or a projected spare throughput capacity given observations that indicate upcoming I/O activity.

Determination module 106 may determine the throughput capacity of the secondary computing system in any of a variety of ways. In some examples, determination module 106 may determine the throughput capacity of the secondary computing system by determining a maximum throughput capacity of the second computing system and subtracting a current throughput utilization of the second computing system. Additionally or alternatively, determination module 106 may determine the throughput capacity of the secondary computing system by projecting a throughput capacity of the secondary computing system based on imminent demands on the throughput capacity of the secondary computing system. For example, the secondary computing system may ascertain the demands placed on the throughput capacity of the secondary computing system based on projected episodic data sync operations and/or episodic data sync operations in progress. In some examples, determination module 106 may determine the throughput capacity of the secondary computing system may determining the throughput capacity of a network resource via which data (e.g., from episodic data sync operations) travels to the secondary computing system. In at least one example, a quality of service engine may regulate access to the network resource to meet one or more service level agreements relying on the network resource.

In some examples, one or more of the systems described herein may provide, from each computing system within the plurality of computing systems to the secondary computing system, information indicating a demand for copying input/output data to the secondary computing system. Thus, determination module 106 may (e.g., as a part of the secondary computing system) receive and/or retrieve information indicating a demand for copying input/output data to the secondary computing system. For example, determination module 106 may receive I/O activity information from the plurality of computing systems indicating levels of I/O activity of the applications hosted by the computing systems. In one example, determination module 106 may receive such I/O activity information from quality of service agents operating on the computing systems. Additionally or alternatively, determination module 106 may retrieve information indicating the size of cached data (e.g., in writeback logs) to be forwarded in upcoming data syncs to the secondary computing system from the computing systems. In some examples, determination module 106 may receive information regarding requests for throughput capacity made by one or more applications on the plurality of computing systems.

In one example, the information indicating the demand may project an anticipated demand based on at least one observation of an application which generates the input/output data to be copied to the secondary computing system. For example, the systems described herein may derive the information indicating the demand from a statistical observation of past I/O behavior by the application, on one or more operations by the application anticipated to create the demand, a trend in demand, and/or a known pattern for demand (e.g., the periodicity of an episodic data sync corresponding to an application).

In some examples, determination module 106 may determine that the throughput capacity of the secondary computing system is less than a collective demand for copying input/output data to the secondary computing system. For example, determination module 108 may compare the projected throughput capacity of the secondary computing system with a sum of the projected episodic data sync activity by the plurality of computing systems and determine that the projected activity exceeds the projected capacity.

Using FIG. 4 as an example, at step 304 determination module 106 may, as a part of quality of service engine 426 on secondary computing system 406, determine the throughput capacity of secondary computing system 406. In some examples, determination module 106 may further determine the projected demand imposed on the throughput capacity of secondary computing system 406 by an upcoming instance of episodic data sync 450. Determination module 106 may then determine that the demand to be imposed by episodic data sync 450 would exceed the throughput capacity of secondary computing system 406. Furthermore, as will be explained in greater detail below, quality of service engine 426 may determine that a service level agreement for secondary computing system may not be met if the projected demand of the upcoming instance of episodic data sync 450 is not reduced.

Returning to FIG. 3, at step 306, one or more of the systems described herein may provide feedback to at least one quality of service agent hosted by at least one computing system within the plurality of computing systems to further limit throughput utilization of at least one of a plurality of applications hosted by the computing system in response to determining the throughput capacity of the secondary computing system. For example, providing module 108 may, as part of computing systems 202(1)-(n) in FIG. 2, provide feedback 260 to at least one of quality of service agents 232(1)-(n) hosted by computing systems 202(1)-(n) to further limit throughput utilization of at least one of applications 222(1)(1)-(1)(p) through 222(n)(1)-(n)(q) hosted by the corresponding computing systems in response to determining throughput capacity 216 of secondary computing system 206.

The term "feedback," as used herein, generally refers to any information, configuration parameters, and/or instructions that may cause a quality of service agent to revise one or more limitations, prioritizations, and/or other quality of service functionalities.

Providing module 108 may provide the feedback in any of a variety of ways. For example, providing module 108 may designate, to the quality of service agent on the computing system, a number of credits available to the computing system for forwarding data to the secondary computing system. Additionally or alternatively, providing module 108 may designate, to the quality of service agent on the computing system, a number of credits available to one or more specific applications executing on the computing system. In some examples, providing module 108 determine how many credits to allocate to each application based on a designated priority of an application (e.g., "gold tier," "silver tier," "bronze tier," etc.) and/or a service level agreement parameter applying to the application (e.g., guaranteeing a minimum iops of 100 and specifying a maximum iops of 1000). For example, providing module 108 may arrange the allocation of credits to ensure that each application can meet the minimum iops of its respective service level agreement. Additionally or alternatively, providing module 108 may weight the allocation of credits according to the minimum iops and/or the maximum iops specified by the service level agreements of the respective applications.

In one example, one or more of the systems described herein may receive, from each computing system within the plurality of computing systems at the secondary computing system, information specifying a throughput service level for each application on the computing system. In this manner, providing module 108 may account for the requirements of applications when imposing limitations on the operation of the applications.

In some examples, providing module 108 may provide feedback to at least one quality of service agent hosted by at least one computing system within the plurality of computing systems to further limit throughput utilization of at least one of a plurality of applications hosted by the computing system is in response to determining that the throughput capacity of the secondary computing system is less than the collective demand. For example, providing module 108 may provide the feedback responsive to determining that a failure to intervene will cause congestion, backpressure, and/or a failure of one or more computing elements (e.g., the secondary computing system, the network, and/or the applications hosted by the computing systems) to meet service level agreements.

In some examples, providing module 108 may provide feedback to at least one quality of service agent hosted by at least one computing system within the plurality of computing systems to further limit throughput utilization of at least one of a plurality of applications hosted by the computing system by providing, based on the information specifying the throughput service level for each application on the computing system, a maximum throughput allotment to the quality of service agent for the computing system that is sufficient to meet the throughput service level for each application on the computing system. For example, a quality of service agent that regulates applications executing on a computing system may place caps on resource usage for some applications. Thus, once a quality of service agent receives the feedback from providing module 108, the quality of service agent may impose the lower of two caps—one cap specified by the local quality of service agent to ensure that each application has sufficient access to resources, and one cap specified by providing module 108 to ensure that I/O activity directed to the secondary computing system and indirectly arising from the I/O activity of the applications does not breach any service level agreements that are applicable to the secondary computing system and/or upon which the secondary computing system may rely.

In some examples, the quality of service agent may only use the feedback to further limit write operations (but not to further limit read operations) by applications executing on the computing system. For example, while write operations performed by applications on the computing system may indirectly cause further write operations to be performed on the secondary computing system, read operations performed by applications on the computing system may not cause further I/O operations to be performed on the secondary computing system—either directly or indirectly. For example, a quality of service agent operating on a compute node may publish the capacity of the compute node as at 1000 iops. The secondary computing system, however, may publish the capacity of the secondary computing system to accept I/O from the compute node as at 100 iops. Thus, the quality of service agent local to the compute node may receive feedback from the secondary computing system to limit write operations by the applications to the compute node storage to 100 iops. However, the quality of service agent local to the compute node may permit 1000 total iops. Thus, the quality of service agent may allow read operations until 1000 iops has been met, but may throttle writes after 100 iops has been met. Otherwise, were the quality of service agent to allow 1000 write operations per second, the compute node could generate 900 extra write operations per second that would could choke the secondary computing system if forwarded immediately or could overload local storage on the compute node if queued on the compute node.

Figure 5:
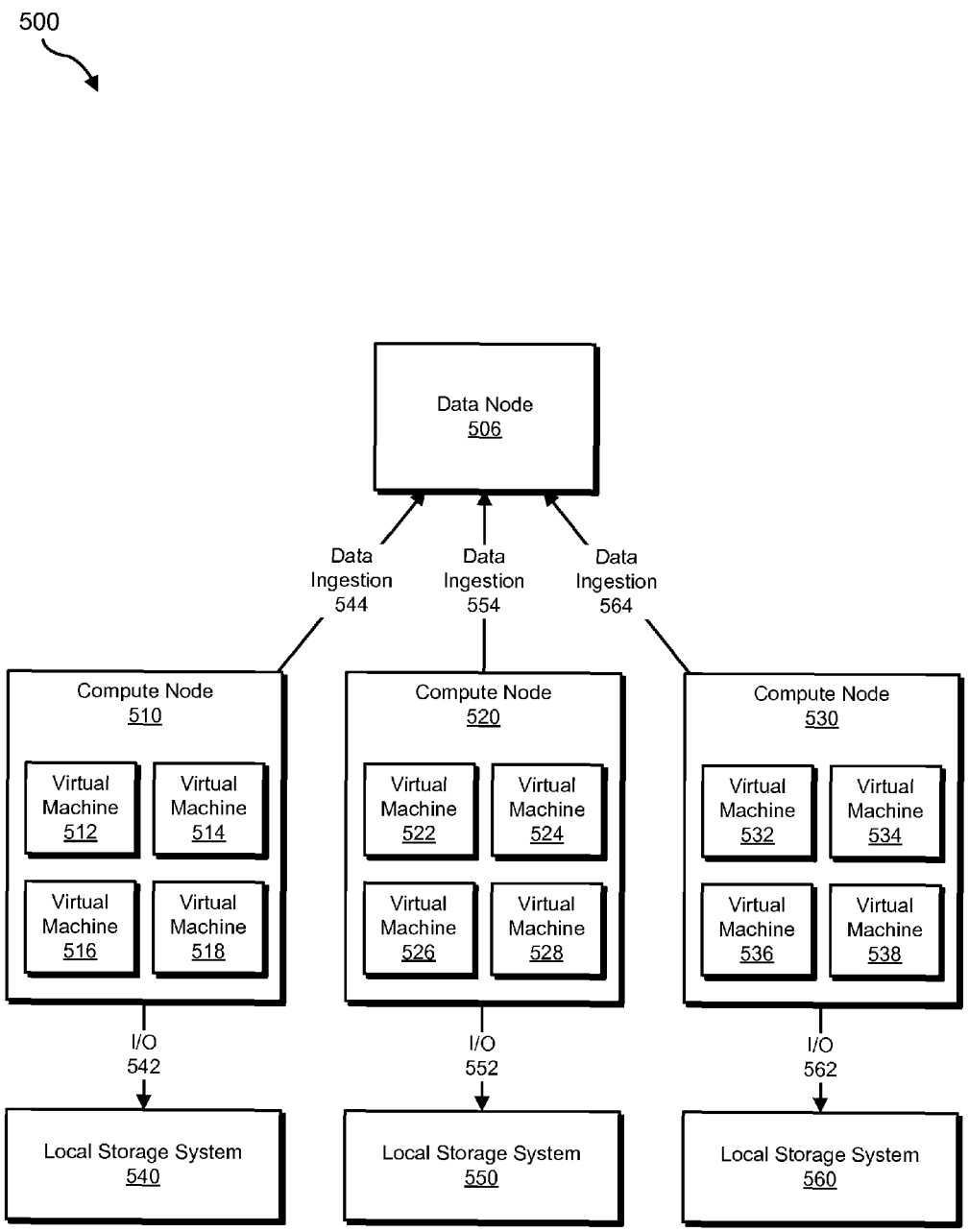
FIG. 5 is a block diagram of an exemplary computing system for end-to-end quality of service control in distributed systems.

FIG. 5 shows an exemplary system 500 useful for illustrating some of the benefits provided by the systems described herein. As shown in FIG. 5, exemplary system 500 may include compute nodes 510, 520, and 530 and a data node 506. Compute node 510 may host virtual machines 512, 514, 516, and 518, which may share a local storage system 540. Compute node 520 may host virtual machines 522, 524, 526, and 528, which may share a local storage system 550. Compute node 530 may host virtual machines 532, 534, 536, and 538, which may share a local storage system 560. Compute nodes 510, 520, and 530 may be configured to forward data derived from the I/O activity of their respective virtual machines (as illustrated by I/O 542, 552, and 562) to data node 506 (as illustrated by data ingestion 544, 554, and 564). While the throughput capacity of data node 506 to accept data may exceed the throughput capacity of any one of compute nodes 510, 520, and 530 on an individual basis, the collective capacity of compute nodes 510, 520, and 530 may exceed the capacity of data node 506. Thus, should two or more of compute nodes 510, 520, and 530 perform a data ingestion to data node 506 simultaneously, data node 506 may be overwhelmed and may fail to meet a service level objective.

While, on an individual basis, compute nodes 510, 520, and 530 may successfully regulate their respective virtual machines to ensure that the individual service level objectives applicable to their respective virtual machines are met (e.g., compute node 510 may ensure that virtual machine 512 does not perform input/output operations so quickly as to overconsume the throughput capacity of local storage system 540, and thereby prevent one or more of virtual machines 514, 516, and 518 from meeting their service level objectives). However, although compute nodes 510, 520, and 530 may successfully regulate their respective virtual machines on an individual basis, without feedback from data node 506 they may fail to regulate their respective virtual machines to prevent data node 506 from becoming choked. In some examples, this failure may lead to backpressure back to the compute nodes that may prevent I/O operations by one or more virtual machines. Accordingly, data node 506 may, based on information about its throughput capacity, about demand for data ingestion by the compute nodes 510, 520, 530, and/or about service level objectives applicable to the virtual machines on compute nodes 510, 520, and 530, send feedback to one or more of compute nodes 510, 520, 530 to limit I/O 542, 552, and/or 562 and, thereby, reduce data ingestion 544, 554, and/or 564.

For example, a local quality of service engine operating on compute node 520 may determine that the residual capacity of compute node 520 is 100 million iops (where the average I/O size may be 8 kilobytes). Thus, the local quality of service engine at compute node 520 may estimate the local data ingestion capacity at 800 gigabytes per second. However, data node 506 may be congested and able to accept only 1 gigabyte per second from compute node 520. In addition, the episodic data sync frequency from compute node 520 to data node 506 may be 10 minutes. Thus, at 1 gigabyte per second, the data node may take 600 gigabytes of data from compute node 520 in 10 minutes. Furthermore, the capacity of compute node 520 may be 1 terabyte, which may therefore be completely filled by compute node 520 in about 2 seconds. A quality of service engine at data node 506 may therefore publish its capacity to compute node 520 as at 1 gigabyte per second (or 600 gigabytes per 10 minutes). In one example, data node 506 may have a spare 400 gigabyte capacity and may therefore publish its capacity to receive data from compute node 520 as approximately 2 gigabytes per second. Thus, compute node 520 may throttle virtual machines 522, 524, 526, and 528 to 2 gigabytes per second, collectively, rather than 800 gigabytes per second. In this manner, the systems described herein may prevent congestion throughout the cluster such that application service level agreements are not violated.

As explained above in connection with method 300 in FIG. 3, a compute tier may host applications. Input/output operations may happen directly from an application to a storage tier (e.g., a hybrid tier including a solid-state storage device (SSD) and a hard disk drive (HDD)). An episodic data sync protocol may flush data derived from these input/output operations to a data node at a specified frequency. In some cases, several compute nodes in the compute tier may flush all the data at nearly the same time (e.g., overlapping one another), thereby potentially congesting the data node. Thus, a quality of service engine at a compute node, operating behind the episodic data sync protocol, may perform flow control over the input/output operations of the application using a feedback mechanism from the data node.

In one example, multiple quality of service engines may operate at the compute layer, the network layer, and the data node layer. An application quality of service objective at a compute node may throttle the applications directly and adhere to user defined service level agreements. A quality of service objective applying to the episodic data sync, as well as user-defined service level agreements, may perform rate controlling at the network layer while pushing the episodic data to the underlying data node system. The quality of service engine regulating the network layer may adhere to the same service level agreements which the quality of service engine regulating the applications has adhered to, and may allocate credits accordingly (with exceptions in the case of burstiness, dead line, etc.). A quality of service engine at the data node may possess information about the service level agreement of the application at the compute node. The quality of service engine at the data node may therefore provide proportional credits to each application on the compute node. The quality of service engine at the data node may address noisy neighbor scenarios as well as account for minimum iops and maximum iops specified for the applications. The quality of service engine at the data node may also account for a service level agreement specifying a frequency with which snapshots of each virtual machine hosting an application are to be taken. Thus, the quality of service engine at the data node may have a more generic and global view than both the quality of service engine directly applicable to the episodic data sync and the quality of service engine directly applicable to the applications hosted on the compute tier. In the manner described above, one or more of the systems described herein may provide quality of service flow control throughout a cluster.

In a further example, a source node may start ingesting data to the storage layer of a target node. This may arise from any of a variety of functions, including an episodic data sync download, a data reflection operation, etc. The quality of service engine at the target node may calculate credits according to the capacity of the physical host and the load of the local system (e.g., at the point in time). The target node may periodically send the calculated credit allotment to the quality of service engine at the source node. The source quality of service engine may incorporate the calculated credit allotment and may cap credits given to an application based on the target node feedback, the source node capacity, and/or the load at the source host. In the manner described above, one or more of the systems described herein may create a feedback mechanism from the data node and peer nodes to control backpressure throughout the cluster. The information published by the feedback mechanism may provide a hint to the quality of service engine at the source node. By increasing the frequency of the feedback, the quality of service engine at the source node may make more accurate decisions. For example, the data node may periodically publish the credits of a particular virtual machine to the compute node hosting that virtual machine. The published feedback may help the quality of service scheduler at the compute node make the globally best decision rather than a decision based on local storage capacity alone.

From the perspective of the data node, the episodic data sync mechanism may be an active producer of throughput demand. However, by providing feedback to quality of service agents on the compute nodes that regulate passive producers (from the perspective of the data node) of throughput demand, the data node may implement an end-to-end quality of service standard throughout the cluster.

Figure 6:
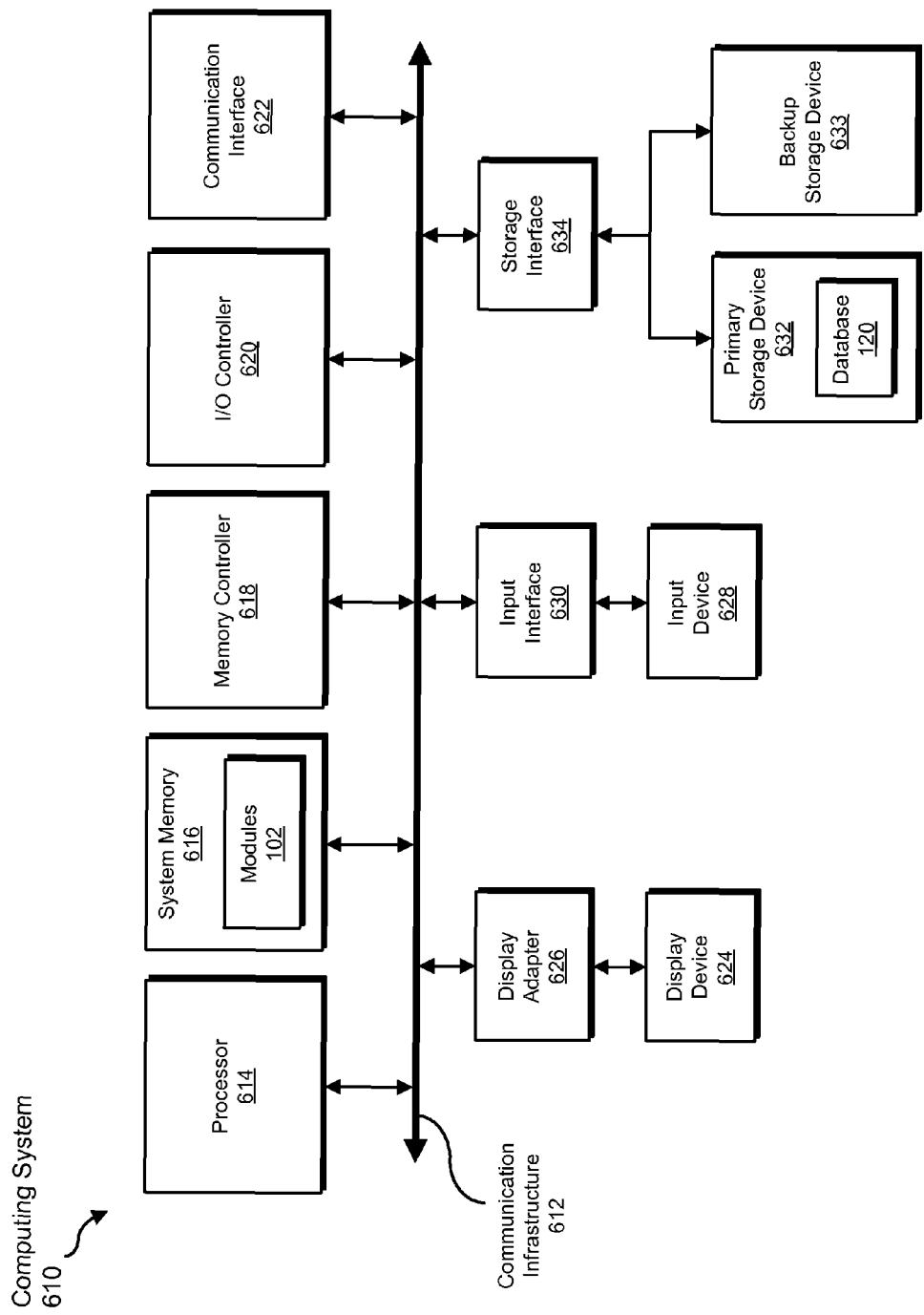
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
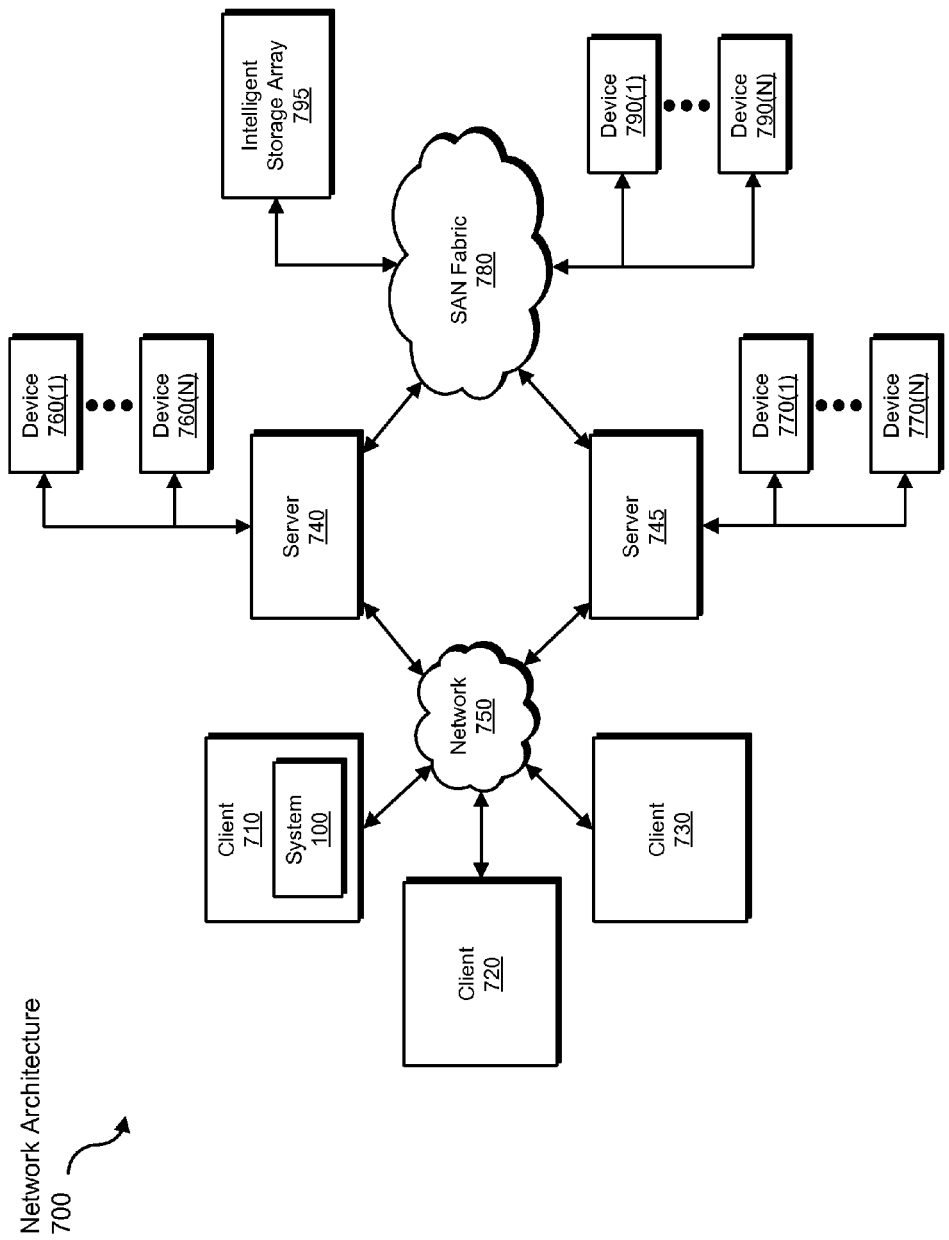
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for end-to-end quality of service control in distributed systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive feedback information to be transformed, transform the feedback information into a quality of service objective, output a result of the transformation to a quality of service engine, use the result of the transformation to regulate access by an application to a resource, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for end-to-end quality of service control in distributed systems, at least a portion of the method being performed by a computing device comprising at least one processor, the method comprising:

identifying a plurality of computing systems, wherein each computing system in the plurality of computing systems:

is coupled to a storage resource for the computing system, the storage resource having a limited throughput capacity;

hosts a plurality of applications that share the storage resource coupled to the computing system and that thereby consume the throughput capacity of the storage resource;

hosts a quality of service agent that limits throughput utilization of the storage resource by each of the plurality of applications to prevent overconsumption of the throughput capacity of the storage resource and to thereby maintain at least one specified throughput service level specified for at least one competing application within the plurality of applications that competes within the plurality of applications for throughput to the storage resource; and copies input/output data generated by the plurality of applications to a secondary computing system, resulting in a separate copy of the input/output data being processed by the secondary computing system and thereby consuming a throughput capacity of the secondary computing system;

the method further comprising:
  determining the throughput capacity of the secondary computing system, the throughput capacity of the secondary computing system being separate from the throughput capacity of the storage resource; and
  providing feedback to at least one quality of service agent hosted by at least one computing system within the plurality of computing systems to further limit throughput utilization of at least one of a plurality of applications hosted by the computing system, and thereby reduce consumption of the throughput capacity of the storage resource, in response to determining the throughput capacity of the secondary computing system.

2. The computer-implemented method of claim 1, wherein each computing system in the plurality of computing systems hosts a plurality of applications that share the storage resource coupled to the computing system by hosting a plurality of virtual machines coupled to a virtual storage appliance that provisions, for the plurality of virtual machines, virtual storage that relies on the storage resource.

3. The computer-implemented method of claim 1, wherein each computing system in the plurality of computing systems copies the input/output data generated by the plurality of applications to the secondary computing system to offload at least one data protection operation from the computing system to the secondary computing system.

4. The computer-implemented method of claim 1, wherein each computing system in the plurality of computing systems copies the input/output data generated by the plurality of applications to the secondary computing system by:
  copying the input/output data to a writeback log;
  episodically forwarding a queued portion of the writeback log to the secondary computing system.

5. The computer-implemented method of claim 1, further comprising receiving, from each computing system within the plurality of computing systems to the secondary computing system, information indicating a demand for copying input/output data to the secondary computing system.

6. The computer-implemented method of claim 5, further comprising determining that the throughput capacity of the secondary computing system is less than a collective demand for copying input/output data to the secondary computing system.

7. The computer-implemented method of claim 6, wherein providing feedback to at least one quality of service agent hosted by at least one computing system within the plurality of computing systems to further limit throughput utilization of at least one of a plurality of applications hosted by the computing system is in response to determining that the throughput capacity of the secondary computing system is less than the collective demand.

8. The computer-implemented method of claim 6, wherein the information indicating the demand projects an anticipated demand based on at least one observation of an application which generates the input/output data to be copied to the secondary computing system.

9. The computer-implemented method of claim 1, further comprising receiving, from each computing system within the plurality of computing systems at the secondary computing system, information specifying a throughput service level for each application on the computing system.

10. The computer-implemented method of claim 9, wherein providing feedback to at least one quality of service agent hosted by at least one computing system within the plurality of computing systems to further limit throughput utilization of at least one of a plurality of applications hosted by the computing system comprises providing, based on the information specifying the throughput service level for each application on the computing system, a maximum throughput allotment to the quality of service agent for the computing system that is sufficient to meet the throughput service level for each application on the computing system.

11. The computer-implemented method of claim 9, wherein providing feedback to at least one quality of service agent hosted by at least one computing system within the plurality of computing systems to further limit throughput utilization of at least one of a plurality of applications hosted by the computing system comprises providing, based on the information specifying the throughput service level for each application on the computing system, a maximum throughput allotment to the quality of service agent for at least one selected application of the plurality of applications that is sufficient to meet the throughput service level for the selected application.

12. A system for end-to-end quality of service control in distributed systems, the system comprising:
  an identification module, stored in memory, that identifies a plurality of computing systems, wherein each computing system in the plurality of computing systems:
    is coupled to a storage resource for the computing system, the storage resource having a limited throughput capacity;
    hosts a plurality of applications that share the storage resource coupled to the computing system and that thereby consume the throughput capacity of the storage resource;
    hosts a quality of service agent that limits throughput utilization of the storage resource by each of the plurality of applications to prevent overconsumption of the throughput capacity of the storage resource and to thereby maintain at least one specified throughput service level specified for at least one competing application within the plurality of applications that competes within the plurality of applications for throughput to the storage resource; and
    copies input/output data generated by the plurality of applications to a secondary computing system, resulting in a separate copy of the input/output data being processed by the secondary computing system and thereby consuming a throughput capacity of the secondary computing system;
  a determination module, stored in memory, that determines the throughput capacity of the secondary computing system, the throughput capacity of the secondary computing system being separate from the throughput capacity of the storage resource;
  a providing module, stored in memory, that provides feedback to at least one quality of service agent hosted by at least one computing system within the plurality of computing systems to further limit throughput utilization of at least one of a plurality of applications hosted by the computing system, and thereby reduce consumption of the throughput capacity of the storage resource, in response to determining the throughput capacity of the secondary computing system; and
  at least one physical processor configured to execute the identification module, the determination module, and the providing module.

13. The system of claim 12, wherein each computing system in the plurality of computing systems hosts a plurality of applications that share the storage resource coupled to the computing system by hosting a plurality of virtual machines coupled to a virtual storage appliance that provisions, for the plurality of virtual machines, virtual storage that relies on the storage resource.

14. The system of claim 12, wherein each computing system in the plurality of computing systems copies the input/output data generated by the plurality of applications to the secondary computing system to offload at least one data protection operation from the computing system to the secondary computing system.

15. The system of claim 12, wherein each computing system in the plurality of computing systems copies the input/output data generated by the plurality of applications to the secondary computing system by:
copying the input/output data to a writeback log;
episodically forwarding a queued portion of the writeback log to the secondary computing system.

16. The system of claim 12, wherein the determination module further receives, from each computing system within the plurality of computing systems to the secondary computing system, information indicating a demand for copying input/output data to the secondary computing system.

17. The system of claim 16, wherein the determination module further determines that the throughput capacity of the secondary computing system is less than a collective demand for copying input/output data to the secondary computing system.

18. The system of claim 17, wherein the providing module provides feedback to at least one quality of service agent hosted by at least one computing system within the plurality of computing systems to further limit throughput utilization of at least one of a plurality of applications hosted by the computing system in response to determining that the throughput capacity of the secondary computing system is less than the collective demand.

19. The system of claim 17, wherein the information indicating the demand projects an anticipated demand based on at least one observation of an application which generates the input/output data to be copied to the secondary computing system.

20. A non-transitory computer-readable medium comprising one or more computer-readable instructions that, when executed by at least one processor of a computing device, cause the computing device to:
identify a plurality of computing systems, wherein each computing system in the plurality of computing systems:
is coupled to a storage resource for the computing system, the storage resource having a limited throughput capacity;
hosts a plurality of applications that share the storage resource coupled to the computing system and that thereby consume the throughput capacity of the storage resource;
hosts a quality of service agent that limits throughput utilization of the storage resource by each of the plurality of applications to prevent overconsumption of the throughput capacity of the storage resource and to thereby maintain at least one specified throughput service level specified for at least one competing application within the plurality of applications that competes within the plurality of applications for throughput to the storage resource; and
copies input/output data generated by the plurality of applications to a secondary computing system, resulting in a separate copy of the input/output data being processed by the secondary computing system and thereby consuming a throughput capacity of the secondary computing system;
determine the throughput capacity of the secondary computing system, the throughput capacity of the secondary computing system being separate from the throughput capacity of the storage resource; and
provide feedback to at least one quality of service agent hosted by at least one computing system within the plurality of computing systems to further limit throughput utilization of at least one of a plurality of applications hosted by the computing system, and thereby reduce consumption of the throughput capacity of the storage resource, in response to determining the throughput capacity of the secondary computing system.

* * * * *